US010375602B2

(12) United States Patent
Charpentier et al.

(10) Patent No.: US 10,375,602 B2
(45) Date of Patent: *Aug. 6, 2019

(54) METHOD AND APPARATUS FOR TRANSMITTING DATA PACKETS AND METHOD AND APPARATUS FOR RECEIVING DATA PACKETS

(71) Applicant: Optis Wireless Technology, LLC, Plano, TX (US)

(72) Inventors: Frederic Charpentier, Langen (DE); Joachim Löhr, Wiesbaden (DE)

(73) Assignee: Optis Wireless Technology, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/987,180

(22) Filed: May 23, 2018

(65) Prior Publication Data

US 2018/0270708 A1    Sep. 20, 2018

Related U.S. Application Data

(63) Continuation of application No. 15/627,754, filed on Jun. 20, 2017, now Pat. No. 10,009,792, which is a (Continued)

(30) Foreign Application Priority Data

Sep. 20, 2005   (EP) ..................... 05020513

(51) Int. Cl.
*H04W 28/06*   (2009.01)
*H04L 1/18*    (2006.01)
(Continued)

(52) U.S. Cl.
CPC ......... *H04W 28/065* (2013.01); *H04L 1/1841* (2013.01); *H04L 5/0046* (2013.01); (Continued)

(58) Field of Classification Search
None
See application file for complete search history.

(56) References Cited

U.S. PATENT DOCUMENTS 5,978,375 A    11/1999  Peterson et al.
6,389,016 B1 *  5/2002  Sabaa ............... H04L 1/1635
                                                    370/231
(Continued)

FOREIGN PATENT DOCUMENTS

CA    2331415       11/1999
CN    1299567 A     6/2001
(Continued)

OTHER PUBLICATIONS

U.S. Appl. No. 15/627,754, filed Jun. 20, 2017; Inventor: Charpentier et al.
(Continued)

*Primary Examiner* — Ayaz R Sheikh
*Assistant Examiner* — Faiyazkhan Ghafoerkhan
(74) *Attorney, Agent, or Firm* — Nixon & Vanderhye P.C.

(57) ABSTRACT

A data packet has a header and a radio link control (RLC) protocol data unit (PDU). The RLC PDU transports at least one full RLC service data unit (SDU), one or two RLC SDU fragments, or at least one full RLC SDU and at least one RLC SDU fragment. An RLC SDU fragment is only located (i) at the beginning or end of the RLC PDU or at the end of the radio link control protocol data or (ii) at the beginning and end of the RLC PDU. A single field in the header consists of a first bit and a second bit, even when a number of full RLC SDUs and RLC SDU fragments in the RLC PDU is more than two. The single field indicates whether (i) the RLC PDU begins with a fragment of a RLC SDU and (ii) the RLC PDU ends with a RLC SDU fragment. The data
(Continued)

packet is formed including the configured header and the configured RLC PDU and transmitted.

12 Claims, 12 Drawing Sheets

Related U.S. Application Data continuation of application No. 15/183,888, filed on Jun. 16, 2016, now Pat. No. 9,713,033, which is a continuation of application No. 14/823,100, filed on Aug. 11, 2015, now Pat. No. 9,385,846, which is a continuation of application No. 14/570,197, filed on Dec. 15, 2014, now Pat. No. 9,130,714, which is a continuation of application No. 13/924,399, filed on Jun. 21, 2013, now Pat. No. 8,923,336, which is a continuation of application No. 13/328,890, filed on Dec. 16, 2011, now Pat. No. 8,494,003, which is a continuation of application No. 12/067,115, filed as application No. PCT/EP2006/008369 on Aug. 25, 2006, now Pat. No. 8,102,880.

(51) Int. Cl.
*H04L 12/801* (2013.01)
*H04L 12/835* (2013.01)
*H04L 29/06* (2006.01)
*H04L 29/08* (2006.01)
*H04L 5/00* (2006.01)

(52) U.S. Cl.
CPC .............. *H04L 47/10* (2013.01); *H04L 47/30* (2013.01); *H04L 69/02* (2013.01); *H04L 69/03* (2013.01); *H04L 69/16* (2013.01); *H04L 69/166* (2013.01); *H04L 69/22* (2013.01); *H04L 69/32* (2013.01); *H04L 69/324* (2013.01)

(56) References Cited

U.S. PATENT DOCUMENTS

| | | | |
|---|---|---|---|
| 6,791,982 B2 | 9/2004 | Westberg | |
| 6,963,751 B1* | 11/2005 | Kordsmeyer | H04L 29/06 370/524 |
| 7,154,873 B2 | 12/2006 | Yi | |
| 7,359,403 B1 | 4/2008 | Rinne | |
| 7,447,234 B2* | 11/2008 | Colas | H04L 29/06 370/474 |
| 8,102,880 B2* | 1/2012 | Charpentier | H04L 1/1841 370/474 |
| 8,494,003 B2* | 7/2013 | Charpentier | H04L 1/1841 370/474 |
| 8,923,336 B2* | 12/2014 | Charpentier | H04L 1/1841 370/474 |
| 9,130,714 B2* | 9/2015 | Charpentier | H04L 1/1841 |
| 9,385,846 B2* | 7/2016 | Charpentier | H04L 1/1841 |
| 9,713,033 B2* | 7/2017 | Charpentier | H04L 1/1841 |
| 10,009,792 B2* | 6/2018 | Charpentier | H04L 1/1841 |
| 2002/0001314 A1* | 1/2002 | Yi | H04L 1/0079 370/469 |
| 2002/0196760 A1* | 12/2002 | Malomsoky | H04L 47/10 370/338 |
| 2003/0012192 A1* | 1/2003 | Dore | H04L 12/56 370/389 |
| 2003/0081592 A1* | 5/2003 | Krishnarajah | H04L 1/0006 370/352 |
| 2003/0157927 A1* | 8/2003 | Yi | H04L 63/0457 455/411 |
| 2003/0211855 A1* | 11/2003 | Sarkkinen | H04W 72/005 455/466 |
| 2004/0017823 A1* | 1/2004 | Kim | H04W 4/18 370/466 |
| 2004/0027999 A1* | 2/2004 | Casaccia | H04L 1/08 370/312 |
| 2004/0057423 A1* | 3/2004 | Beckmann | H04L 1/1614 370/352 |
| 2004/0184437 A1* | 9/2004 | Lee | H04L 1/1685 370/349 |
| 2004/0218586 A1* | 11/2004 | Khoury | H04L 12/5692 370/352 |
| 2005/0135295 A1* | 6/2005 | Walton | H04W 74/00 370/328 |
| 2005/0147040 A1* | 7/2005 | Vayanos | H03M 13/2707 370/235 |
| 2005/0169205 A1* | 8/2005 | Grilli | H03M 13/2703 370/313 |
| 2005/0193309 A1* | 9/2005 | Grilli | H03M 13/2707 714/752 |
| 2005/0227695 A1* | 10/2005 | Rasanen | H04L 12/5602 455/436 |
| 2005/0255843 A1* | 11/2005 | Hilpisch | H04R 25/554 455/425 |
| 2006/0034175 A1* | 2/2006 | Herrmann | H04L 1/0007 370/236 |
| 2006/0227747 A1* | 10/2006 | Kim | H04W 36/005 370/331 |
| 2006/0251105 A1* | 11/2006 | Kim | H04L 1/1685 370/449 |
| 2007/0121540 A1* | 5/2007 | Sharp | H04W 92/02 370/328 |
| 2007/0147315 A1* | 6/2007 | Khoury | H04W 92/02 370/338 |
| 2007/0201424 A1* | 8/2007 | Kobayashi | H04L 63/0428 370/349 |
| 2007/0268932 A1* | 11/2007 | Lee | H04L 1/1685 370/469 |
| 2007/0291695 A1* | 12/2007 | Sammour | H04W 36/02 370/331 |
| 2009/0116490 A1 | 5/2009 | Charpentier et al. | |
| 2012/0087309 A1 | 4/2012 | Charpentier et al. | |
| 2013/0343276 A1 | 12/2013 | Charpentier et al. | |
| 2015/0139132 A1 | 5/2015 | Charpentier et al. | |
| 2015/0350384 A1 | 12/2015 | Charpentier et al. | |

FOREIGN PATENT DOCUMENTS

| | | | |
|---|---|---|---|
| CN | 1322424 A | 11/2001 | |
| CN | 1348286 A | 5/2002 | |
| CN | 1377549 A | 10/2002 | |
| CN | 1097911 C | 1/2003 | |
| CN | 1401199 A | 3/2003 | |
| CN | 1434592 A | 8/2003 | |
| CN | 1155210 C | 6/2004 | |
| CN | 1620768 A | 5/2005 | |
| EP | 1 326 388 | 7/2003 | |
| EP | 1471687 | 10/2004 | |
| EP | 1471687 A1 * | 10/2004 | ......... H04L 12/5601 |
| EP | 1326388 A3 * | 7/2005 | ......... H01L 1/1841 |
| JP | 2002514843 | 5/2002 | |
| KR | 20000059636 A | 10/2000 | |
| KR | 1020040074525 | 8/2004 | |
| RU | 2005102606 | 8/2005 | |
| WO | 9957848 | 11/1999 | |
| WO | WO 01/60108 | 8/2001 | |
| WO | 0178323 | 10/2001 | |
| WO | 2004013845 | 2/2004 | |
| WO | 2004042953 | 5/2004 | |
| WO | WO2005076536 A1 | 8/2005 | |

OTHER PUBLICATIONS

Office Action dated Oct. 5, 2017 in co-pending U.S. Appl. No. 15/627,754, 36 pages.

Chinese Second Office Action dated Dec. 22, 2014 in CN 201210126412.0 and English translation, 9 pages.

(56) References Cited

OTHER PUBLICATIONS

Chinese Office Action with English Translation and Search Report dated Mar. 31, 2014 in Chinese Patent Application No. 201210126412.0, 15 pages.
Japanese Office Action dated Feb. 5, 2013, for corresponding JP Application No. 2012-060607, 4 pages.
Korean Office Action dated Oct. 29, 2012, for corresponding KR Application No. 20087009347, 16 pages.
Office Action in the corresponding Russian Patent Application dated Jul. 13, 2010, with English translation, 8 pages.
International Search Report dated Jan. 11, 2007, for corresponding International Application No. PCT/EP2006/008369, 3 pages.
Office Action, dated Jul. 23, 2013, for corresponding Canadian application No. 2622195, 4 pages.
Chinese Third Office Action dated Aug. 5, 2015 in CN 201210126412.0 and English translation, 12 pages.
European Office Action dated Jan. 27, 2016 issued in EP 06777073.5, 5 pages.
Extended European Search Report dated Apr. 20, 2018 in EP Application 18152460.4, 7 pages.
U.S. Appl. No. 15/627,754, filed Jun. 20, 2017.
U.S. Appl. No. 15/183,888, filed Jun. 16, 2016.
U.S. Appl. No. 14/823,100, filed Aug. 11, 2015.
U.S. Appl. No. 13/770,199, filed Feb. 19, 2013.
U.S. Appl. No. 13/433,577, filed Mar. 29, 2012.
U.S. Appl. No. 13/010,150, filed Jan. 20, 2011.
U.S. Appl. No. 12/541,400, filed Aug. 14, 2009.
U.S. Appl. No. 12/417,284, filed Apr. 2, 2009.
U.S. Appl. No. 10/516,937, filed Dec. 14, 2004.
PPP Multilink protocol from network working group, published on Aug. 31, 1996, pp. 1-24.
Packing multiple higher layer SDUs into Single MAC PDU from IEEE 802.6 Broadband wireless Access working group, published on Jan. 16, 2001, 21 pages.
Air Interface for Fixed Broadband Wireless Access Systems, IEEE 802.16.1-00/01r4, Sep. 2000, 340 pages.
Preliminary Examination Report dated Dec. 21, 2018 in BR Application No. PI 0617569-4 and English translation, 8 pages.
Panasonic, "LTE—Layer 2 protocol functions" 3GPP TSG RAN2#48 London, UK, Aug. 29, 2005-Sep. 2, 2005, R2-051882, Aug. 29, 2005, 7 pages.

* cited by examiner

FIG. 1 - OSI layer model

FIG. 2 - SDU and PDU in the OSI layer model

FIG. 3 - SAR signaling by fragment numbering

FIG. 4 - SAR signaling with Beginning and End flags

FIG. 5 - SAR signaling with length indicators

FIG. 6 - SDU Segmentation and PDU concatenation Processes

FIG. 7 - Transport Channel Block generation

FIG. 8 - Error propagation in UMTS R99

FIG. 9 - Proposed SAR and concatenation processes

METHOD AND APPARATUS FOR TRANSMITTING DATA PACKETS AND METHOD AND APPARATUS FOR RECEIVING DATA PACKETS

CROSS-REFERENCE(S) TO RELATED APPLICATION

This is a continuation of U.S. patent application Ser. No. 15/627,754, filed Jun. 20, 2017 (now U.S. Pat. No. 10,009,792), which is a continuation of U.S. patent application Ser. No. 15/183,888, filed Jun. 16, 2016 (now U.S. Pat. No. 9,713,033), which is a continuation of U.S. patent application Ser. No. 14/823,100, filed Aug. 11, 2015 (now U.S. Pat. No. 9,385,846), which is a continuation of U.S. patent application Ser. No. 14/570,197, filed Dec. 15, 2014 (now U.S. Pat. No. 9,130,714), which is a continuation of U.S. patent application Ser. No. 13/924,399, filed Jun. 21, 2013 (now U.S. Pat. No. 8,923,336), which is a continuation of U.S. patent application Ser. No. 13/328,890, filed Dec. 16, 2011 (now U.S. Pat. No. 8,494,003), which is a continuation of U.S. patent application Ser. No. 12/067,115, filed Sep. 4, 2008 (now U.S. Pat. No. 8,102,880), which is a national stage of PCT/EP2006/008369, filed Aug. 25, 2006, which is based on European Application No. 05020513.7, filed Sep. 20, 2005, the entire contents of each of which are incorporated by reference herein.

BACKGROUND

The field of the invention is the mapping of high layer packets into lower layer frames in a communication system, which can be either a wireless or fixed line network.

In order to adapt the packets delivered by the upper layer to the capabilities of the physical network (e.g., maximum frame size), it is sometimes necessary to segment or fragment them into several blocks that would be transmitted by separate frames. In the same way, it might be also necessary to concatenate several packets into one frame in order to increase transmission efficiency.

The invention proposes a new and efficient way of indicating to the receiving unit how segmentation and concatenation has been done at the transmitter side.

The necessity of adapting higher layer packets to the characteristics of a physical network is a classical issue for all type of communication systems, such as wireless networks (GSM, UMTS, WiLAN, WiMAX, etc.) or fixed networks (IP, Frame relay, PPP, ATM, etc.).

General Overview of the OSI Layer

In this section, a brief introduction is given to the OSI model (see FIG. 1) that will be used to illustrate the explanations below.

The Open Systems Interconnection Reference Model (OSI Model or OSI Reference Model for short) is a layered abstract description for communications and computer network protocol design. The OSI model divides the functions of a system into a series of layers. Each layer has the property that it only uses the functions of the layer below, and only exports functionality to the layer above. A system that implements protocol behavior consisting of a series of these layers is known as a 'protocol stack' or 'stack'. Its main feature is in the junction between layers which dictates the specifications on how one layer interacts with another. This means that, in principle, a layer written by one manufacturer can operate with a layer from another. For our purpose, only the three first layers will be described.

The main purpose of the physical layer, or layer 1, is the transfer of information (bit) over a specific physical medium (e.g., coaxial cables, twisted pairs, optical fibers or the air). It converts or modulates data into signals that are transmitted over a communication channel.

The purpose of the data link layer, or layer 2, is to shape the information flow in a way compatible with the specific physical layer by breaking up the input data into data frames (Segmentation And Re-assembly or SAR functions). Furthermore it may detect and correct potential transmission errors by requesting a retransmission of a lost frame. It provides an addressing mechanism and may offer flow control algorithms in order to align the data rate with the receiver capacity. Finally, when a shared medium is concurrently used by multiple transmitter and receivers, it offers mechanisms to regulate and control access to the physical medium. As the span of functions of the data link layer is large, the data link layer is often subdivided in two sublayers (e.g., RLC and MAC sublayers in UMTS). Typical examples of layer 2 protocols are PPP/HDLC, ATM, frame relay for fixed line networks and RLC, LLC or MAC for wireless systems.

The network layer, or layer 3, provides the functional and procedural means for transferring variable length packets from a source to a destination via one or more networks while maintaining the quality of service requested by the transport layer. The main purposes of the network layer are to perform network routing, network fragmentation and congestion control functions. The main examples of network layer protocols are the IP Internet Protocol or X.25.

More information on OSI layer model can be found in "Computer Networks", (Andrew S. Tanenbaum, fourth edition, Prentice Hall International Edition, pages 37-41, section 1.4.).

SDU and PDU Definition

In order to formally describe in a generic way the exchange of packets between layers in the OSI model, SDU (Service Data Unit) and PDU (Protocol Data Unit) entities have been defined. An SDU is a unit of information transmitted from a protocol at the layer N+1 that requests a service to a protocol located at layer N via an SAP (Service Access Point). A PDU is a unit of information exchanged between peer processes at the transmitter and at the receiver of the same protocol located at the same layer N. A PDU is generally formed by a payload part consisting of the processed version of the received SDU and control information, e.g., a layer N specific header and possibly terminated by a trailer. Since there is no direct physical connection (except for L1) between these peer processes, a PDU is forwarded to the layer N−1 for processing. Therefore a layer N PDU is from a layer N−1 point of view an SDU. This is illustrated in FIG. 2.

Purpose of Fragmentation/Segmentation

Fragmentation, or equivalently segmentation, may be required for three different reasons.

First of all, fragmentation may be required to transport datagrams or packets though networks whose maximum allowed datagram size or maximum transfer unit (MTU) is smaller than their size. Datagram fragmentation is typically implemented at the IP layer and is specified as the IP Fragmentation in the IPv4 or IPv6 version of the standard. Similarly segmentation is necessary when data is transported over an ATM network in order to fit a payload size of 48 octets into the ATM cell. This is performed in the ATM adaptation layers (AAL) between the ATM layer 2 and the transport layer (e.g., IP).

Secondly, fragmentation may be carried out in order to balance traffic load on parallel links, for instance on parallel ISDN links. The PPP multilink protocol (MP) ("The PPP Multilink Protocol (MP)", RFC 1990, Sklower, K., Lloyd, B., McGregor, G., Carr, D. and T. Coradetti, August 1996) based on PPP describes a method for splitting, recombining and sequencing datagrams across multiple logical data links.

Finally, in wireless systems, packet segmentation potentially combined with concatenation is often performed at the layer 2 (e.g in RLC sublayer in UMTS, 3GPP TS 25.322, v6.4.0, "Radio Link Control (RLC) protocol specification") in order to fit higher layer packets into the resources offered by the lower layer. As resources are typically scarce in a wireless environment, concatenation of several higher layer packets is recommended in order to enhance the overall system efficiency.

In order for the receiver unit to separate concatenated fragments and correctly recombine the received fragments into the original packets, segmentation information needs to be delivered to the receiving unit. This information, usually combined with a numbering technique tagging each fragment, enables the layer 2 at the receiver to deliver full and consistent packets to the next higher layer.

In the following sections, several existing methods to signal segmentation will be presented which will help to understand the differences to the present invention.

SAR Signaling Via Fragment Numbering

The first class of methods to indicate fragmentation regroups several similar techniques that indicate the position of the fragments within the source packet. Two elements are necessary: the first one is an index pointing to the position of the fragment within the source packet. This index can either take the form of a fragmentation offset (IP fragmentation, see "Computer Network", Andrew S. Tanenbaum, fourth edition, Prentice Hall international Edition, page 37-41 section 1.4.) or equivalently a fragment sequence number FSN (WiLAN, see 802.11: Wireless LAN Medium Access Control (MAC) and Physical Layer (PHY) specifications).

This index must be initialized to a known value (e.g., FSN=zero) for the first fragment of a source packet. The receiver unit uses this index to reorder fragments in the correct sequence and detect lost fragments. Furthermore the last fragment of a packet is indicated with a one-bit flag (LF). An un-fragmented packet is signaled to the receiver side by setting the index to the initial position (e.g., FSN=zero) and simultaneously indicating that this packet is a last fragment in the source packet. This technique is used for instance in IP fragmentation protocol or in the ATM Adaptation Layer AAL-1. The 802.11 WiLAN MAC layer uses the same technique as well. WiLAN also appends a field identifying the source packet to each fragment. This is necessary as 802.11 MAC may be configured to reorder packets at the receiver side before delivery to the next higher layer. This in-sequence delivery requirement does not exist at the IP layer, as reordering is either not required or performed by a higher layer (e.g., TCP).

The principle of the SAR technique via fragment numbering in WiLAN is shown in FIG. 3.

The signaling overhead is relatively significant since each fragment must carry at least the last fragment flag LF and the fragment sequence number FSN and eventually the sequence number SN of the source packet.

SAR Signaling Via Beginning/End Flags

The second class of SAR methods is widely used in various protocols such as ATM Adaptation layer AAL-¾, Frame Relay Frame Relay Fragmentation Implementation Agreement FRF.12, Frame Relay Forum Technical Committee, WiMAX and PPP multilink (MP) ("The PPP Multilink Protocol (MP)", RFC 1990, Sklower, K., Lloyd, B., McGregor, G., Carr, D. and T. Coradetti, August 1996). The main idea in this second class of SAR techniques is to use two one-bit flags to indicate for each SAR PDU, whether the PDU is the first, the last or a middle fragment of an SDU or whether it is a complete SAR SDU. Both flags are part of the PDU header. In some implementations (Frame Relay and PPP multilink), one distinguishes the function of the two flags as one indicating the beginning of an SDU and the other one indicating its end. The beginning fragment bit B is set to 1 on the first fragment derived from an SAR SDU and set to 0 for all other fragments from the same SDU. The ending fragment bit E is set to 1 on the last fragment and set to 0 for all other fragments. A PDU may have both the beginning and ending fragment bits set to 1. In this case, it indicates that no segmentation took place. A fragment sequence numbering is further added in order to the receiver unit to detect fragment loss and potentially to perform PDU reordering if the link does not preserve the PDU sequence. After reordering, the receiver can easily check the B and E bits to identify which SAR PDU need to be combined to re-build the original SDUs. Figure gives an illustration of this technique.

SAR Signaling Via Length Indicators

A third class consists in a set of techniques that are using length indicator fields as pointers to indicate the boundaries of the SDUs. A good example is the RLC (Radio Link Control) in UMTS R99. In RLC, an RLG PDU may carry segments of several SDUs or padding bits. Indeed UMTS R99 operates with fixed size PDU which may not be aligned with the length of the SDUs to be transmitted. As radio resources are scarce, it was seen as necessary to allow concatenation of SDU at PDU level. In a generic way, a variable number of length indicators (LI) are added to the PDU header. A length indicator is used to indicate the last octet of each RLC SDU ending within the PDU. As usual, a sequence numbering based on the PDU is added in the header in order to enable loss detection and reordering. The receiver can therefore perform reordering, request the retransmission of lost PDU and reassemble the SDU. Furthermore an LI with a special value indicates when padding is used to fill up the end of a PDU.

The main drawback of this technique is that the overhead depends on the number of SDU segments in a PDU, and due to this the header also has a variable size. Moreover the usage of special fields tends to raise the complexity of the RLC.

Finally, this technique is not very efficient when considering variable PDU size, which would be more flexible and better adapted to a full packet oriented environment over a wireless system. A generic example of this technique is shown in FIG. 5.

Concatenation Function in Wireless System

Concatenation is a function that is particularly useful for wireless systems.

The combination of segmentation and concatenation enables the transmitter to adapt the incoming, variable length SDUs better to the resources offered. In case of wireless system, the number of bits that can be transmitted over a transmission time interval (TTI) may significantly vary depending on the radio conditions, the code rate and the physical resources dedicated to the transmission. For instance, a mobile station close to the transmitter requires less channel encoding than a mobile station further away. With the same allocated physical resources and the same transmission power, the first mobile station will be able to receive much more data than the second mobile station. Moreover, when packet services are considered, the data rate provided by the server may in principle vary significantly over time.

In UMTS, SDU segmentation and concatenation of SDU segments into PDU are performed at the RLC level without respect to the physical resources offered and with fixed pre-defined PDU size. In order to emulate some kind of dynamic behavior, the MAC layer, based on some indications from the physical layer, determines the number of PDUs to be transmitted per TTI. In UMTS R99, the selected PDUs are transmitted in the form of so-called transport channel blocks (TrCH Blk or TrBlk) to the physical layer which concatenates them and forms a transport channel block set. In UMTS Rel-5 HSDPA, the selected PDUs are directly concatenated in the MAC layer transport channel block (TrCH Blk or TrBlk) which, thus, contains several PDUs as shown in FIG. 6. Depending on the radio conditions or other variables, the number of selected PDUs per TTI varies as shown in FIG. 7. Therefore the sequential use of SDU segmentation/concatenation at the RLC layer with PDU concatenation at the MAC layer (UMTS Rel-5 HSDPA) or at the physical layer (UMTS R99) enables the transmitter to dynamically adapt the transmission to instantaneous variables (incoming data from upper layer and resources offered by lower layers).

In UMTS, the receiver unit is informed of the number of PDUs transmitted per TTI either via out-of-band signaling (Transport Format Combination Indicator or TFCI) or in-band in a specific header (e.g., MAC-hs header in HSDPA). It should be noted that the PDU concatenation step is generally performed independently of the structure of the PDUs, thus it may happen that an SDU spans over several TTIs.

Efficient Overhead in Systems with Highly Variable Data Rate

The sequential use of SDU segmentation and PDU concatenation as presented above works well when the range of the number of PDUs to be transmitted is not too large. However in case of highly variable systems (highly variable physical resources and highly variable data rate), which may become more common in future systems with high bandwidth, the usage of a fixed size PDU tends to be suboptimum as the size of the PDU may not be adapted to the full range of the data rate. Indeed in the case of packet service the size of the SDU can in principle vary from 40 octets for TCP acknowledgements up to the size of the MTU (e.g., around 1500 octets for Ethernet). On the physical layer side, scheduled shared systems such as HSDPA in UMTS offer physical resources per TTI that may vary from few kbps to the complete bandwidth (e.g., 14 Mbps in HSDPA). It is expected that this trend will be confirmed by future wireless system.

The problem comes from the fact that the small PDU size that would be optimal for the lower part of the data rate span, becomes a burden when considering the higher part of the data rate span. Indeed, the receiver will have more PDUs to treat per TTI and would require more computation. Furthermore the sequence number range identifying the PDUs may become too short, and a wrap around problem may occur. Finally the overhead, which is equal to n*PDU header_size, increases more or less linearly with the length of the transport channel block. Using a large PDU will force the transmitter to either delay transmission in order to fill up the PDU or to heavily pad the unused space in the PDU at low data rates. Increased jitter or extensive padding have a strong negative influence on the efficiency of a radio system and should be avoided.

In general, the size of the PDU is a static parameter of the radio bearer used to carry the considered service. This parameter cannot be changed without a heavy reconfiguration procedure. Therefore it is difficult to efficiently adapt the link to the characteristics of the incoming SDUs or to the resources offered by the lower layer without strong limitations on either the data rate or the range of physical resources that can be allocated per TTI.

Error Propagation

The SAR signaling techniques with length indicators are sensitive to error propagation. Indeed it may happen that the loss of a PDU forces the receiver to intentionally drop correctly received SDUs due to SDU border uncertainty. As shown in FIG. 8, the loss of PDU i+2 forces the receiver to drop the correctly received PDU i+3, since it cannot determine whether the fragment contained in PDU i+3 is a full SDU (alternative 1) or a segment of SDU (alternative 2).

In UMTS Rel-6, some attempts have been made to limit this issue and to reduce the overhead in some particular conditions where the SDU size matches the PDU size. However in the general case, this problem comes from the fact that each PDU carries information on its own structure and without respect to the inner structure of the adjacent PDUs.

SAR signaling techniques with beginning/end flags or with fragment numbering are much more robust in this as the receiver exactly knows when enough PDUs are received. However, the overhead of these techniques increases linearly with the number of concatenated PDUs.

As can be seen, several techniques exist to signal segmentation and concatenation. However they tend to suffer either from high overhead, lack of flexibility or may lead to increased complexity at the receiver side. Robustness towards error propagation is not given, either.

SUMMARY

It is an object of the invention to provide efficient and feasible segmentation and concatenation in packet communications.

The object is solved by the subject matter of the independent claims. Advantageous embodiments of the invention are subject matters to the dependent claims.

Different embodiments of the invention provide a data packet structure, method, apparatus, system and computer readable medium for conveying data of service data units using protocol data units. The data packet comprises a packet payload comprising at least one protocol data unit, wherein a protocol data unit comprises a service data unit or a fragment of the service data unit and a data packet header comprising an indicator indicating whether or not the data packet payload begins with a protocol data unit being a fragment of a service data unit and whether or not the data packet payload ends with a protocol data unit being a fragment of the service data unit.

According to an advantageous embodiment, the indicator consist of two flags, wherein the first flag indicates whether the data packet payload begins with the protocol data unit being a fragment of a service data unit and the second flag indicates whether the data packet payload ends with a protocol data unit being a fragment of the service data unit.

The advantage of this embodiment is that the flag, when set, indicates a protocol data unit being a fragment of the service data unit.

According to another advantageous embodiment, the data packet structure comprises a sequence number indicator indicating the position of the data packet in a sequence of data packets.

In a further advantageous embodiment, the method for transmitting data packets comprising service data units comprises the steps of forming at least one protocol data unit comprising a service data unit or a fragment of a service data unit, forming a data packet payload comprising at least one protocol data unit, forming a data packet header comprising at least an indicator for indicating whether or not the data packet payload begins with a protocol data unit being a fragment of a service data unit and whether or not the data packet payload ends with a protocol data unit being a fragment of the service data unit, forming a data packet comprising the data packet header and the data packet payload, and transmitting the data packet over a channel.

According to another advantageous embodiment, the data packet payload comprises a plurality of protocol data units and the data packet begins with a first protocol data unit and ends with a last protocol data unit.

In a further a advantageous embodiment, the step of forming the data packet payload of a predetermined size further comprises the following sub-steps a), b) and c). In a) it is determined whether the size remaining in the data packet payload is sufficient to transport a next service data unit or a fragment remaining from a previous service data unit. If this is the case, in b) a next protocol data unit comprising the next service data unit or a fragment of a previous service data unit is formed and the protocol data unit is added to the data packet payload. Otherwise, a next service data unit or fragment remaining from a previous service data unit is fragmented and a protocol data unit is formed comprising a first fragment of the service data unit or fragment remaining from a previous service data unit such that the size of the protocol data unit corresponds to the remaining size of the data packet payload and the protocol data unit is added to the data packet payload. Steps a) and b) are repeated until the data packet payload has an insufficient size remaining to transport a next service data unit.

It is further advantageous that, upon having filled the data packet payload with protocol data units, the indicators to indicate whether or not the data packet payload begins with the protocol data unit being a fragment of the service data unit and whether or not the data packet payload ends with a protocol data unit being a fragment of the service data unit are set.

In another advantageous embodiment, the data packet payload is dynamically fixed by a resource allocation entity depending on radio conditions and buffer occupancy.

In a further advantageous embodiment, a method for receiving data packets comprising a data packet header and a data packet payload, wherein the data packet payload comprises at least one protocol data unit comprising either a service data unit or a fragment of a service data unit is described. The method comprises the steps of receiving data packets over a channel, each data packet comprising a data packet payload and a data packet header, the data packet header comprising a sequence number indicator indicating the position of the data packet in a data packet sequence, and an indicator wherein the indicator indicates whether or not the data packet payload begins with the protocol data unit being a fragment of a service data unit and whether or not the data packet ends with the packet payload being a fragment of the service data unit, saving the protocol data units of the received data packet payload with previously received protocol data units in a reception buffer in-sequence according to the sequence number indicator, and marking whether a first protocol data unit of the received data packet payload is to be combined with the previous in-sequence protocol data unit and whether a last protocol data unit of the received data packet payload is to be combined with a next in-sequence protocol data unit.

According to a further advantageous embodiment, the reception buffer is analyzed as to whether the protocol data unit is marked, and if it is, the protocol data unit is combined with the other marked protocol data unit to form a service data unit.

In another advantageous embodiment, an apparatus for transmitting data packets comprising service data units is described. The apparatus comprises a protocol data unit forming means adapted to form a protocol data unit comprising a service data unit or a fragment service data unit, a data packet payload forming means adapted to form a data packet payload comprising at least one protocol data unit, data packet header forming means adapted to form a data packet header comprising an indicator for indicating whether or not the data packet payload begins with a protocol data unit being a fragment of a service data unit and whether or not the data packet payload ends with a protocol data unit being a fragment of a service data unit, data packet forming means adapted to form a data packet comprising the data packet header and the data packet payload, and transmitting means adapted to transmit the data packets over a channel.

A further embodiment of this invention relates to an apparatus for receiving data packets comprising a data packet header and a data packet payload, wherein a data packet payload comprises at least one protocol data unit comprising either a service data unit or a fragment of a service data unit. The apparatus comprises receiving means adapted to receive data packets over a channel, each data packet comprising a data packet payload and a data packet header, the data packet header comprising a sequence number indicator indicating the position of the data packet in a data packet sequence, and an indicator, wherein the indicator indicates whether or not the data packet payload begins with a protocol data unit being a fragment of a service data unit and whether or not the data packet ends with the protocol data unit being a fragment of the service data unit. It further comprises a reception buffer adapted to save the protocol data units of the received data packet payload with previously received protocol data units in-sequence according to the sequence number indicator, and marking means adapted to mark whether a first protocol data unit of the received data packet payload is to be combined with the previous in-sequence protocol data unit and whether a last protocol data unit of the received data packet payload is to be combined with a next in-sequence protocol data unit.

Another embodiment of the invention relates to a computer readable medium storing instructions that, when executed by a processor of a transmitting apparatus, cause the transmitting apparatus to transmit data packets comprising service data unit. This is done by forming at least one protocol data unit comprising a service data unit or a fragment of a service data unit, forming a data packet payload comprising protocol data units, forming a data packet header comprising at least an indicator for indicating whether or not data packet payload begins with a protocol data unit being a fragment of the service data unit and whether or not the data packet payload ends with a protocol data unit being a fragment of the service data unit, and transmitting the data packets over a channel.

A further advantageous embodiment relates to a computer readable medium storing instructions that, when executed by a processor of a receiving apparatus, cause the receiving apparatus to receive data packets comprising a data packet header and a data packet payload, wherein the data packet payload comprises at least one protocol data unit comprising either a service data unit or a fragment of a service data unit is described. The method comprises the steps of receiving data packets over a channel, each data packet comprising a data packet payload and a data packet header, the data packet header comprising a sequence number indicator indicating the position of the data packet in a data packet sequence, and an indicator wherein the indicator indicates whether or not the data packet payload begins with the protocol data unit being a fragment of a service data unit and whether or not the data packet ends with the packet payload being a fragment of the service data unit, saving the protocol data units of the received data packet payload with previously received protocol data units in a reception buffer in-sequence according to the sequence number indicator, and marking whether a first protocol data unit of the received data packet payload is to be combined with the previous in-sequence protocol data unit and whether a last protocol data unit of the received data packet payload is to be combined with a next in-sequence protocol data unit.

BRIEF DESCRIPTION OF THE DRAWINGS

In the following, the invention is described in more detail with reference to the attached figures and drawings. Similarly, our corresponding details and the figures are marked with the same references.

DETAILED DESCRIPTION

The present invention is applicable to any data packet communication system using variable length transmission frames, for example, wireless networks such as GSM, UMTS, WiLAN, WiMAX, etc., or fixed networks such as IP, frame relay, PPP, ATM, etc.

The different embodiments of the invention are described based on the OSI layer model, especially the exchange of packets between an SDU and PDU layer. Please see the background section for a more detailed description of the relevant parts of the OSI layer model as well as SDUs and PDUs. The background section also describes the reasons for employing fragmentation and/or segmentation in communication networks.

In this invention, a method is proposed that enables an efficient Segmentation and Concatenation procedure at the fixed signaling cost, which makes the overhead decrease in percent with the length of the transmitted TrBlk.

Figure 1:
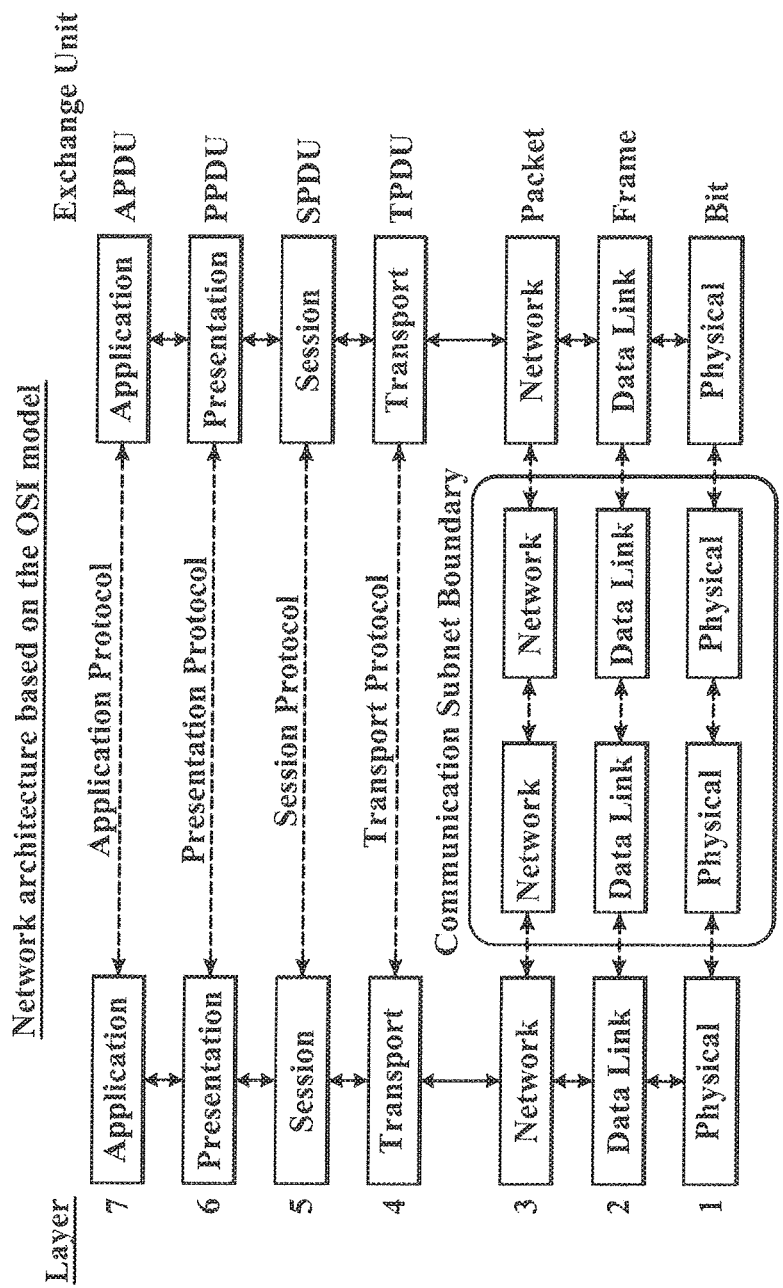
FIG. 1 shows the OSI layer model.
Figure 2:
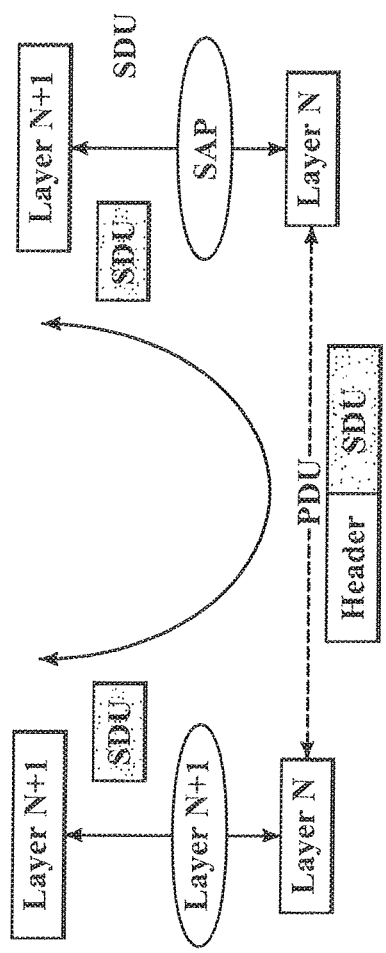
FIG. 2 shows SDU and PDU in the OSI layer model.
Figure 3:
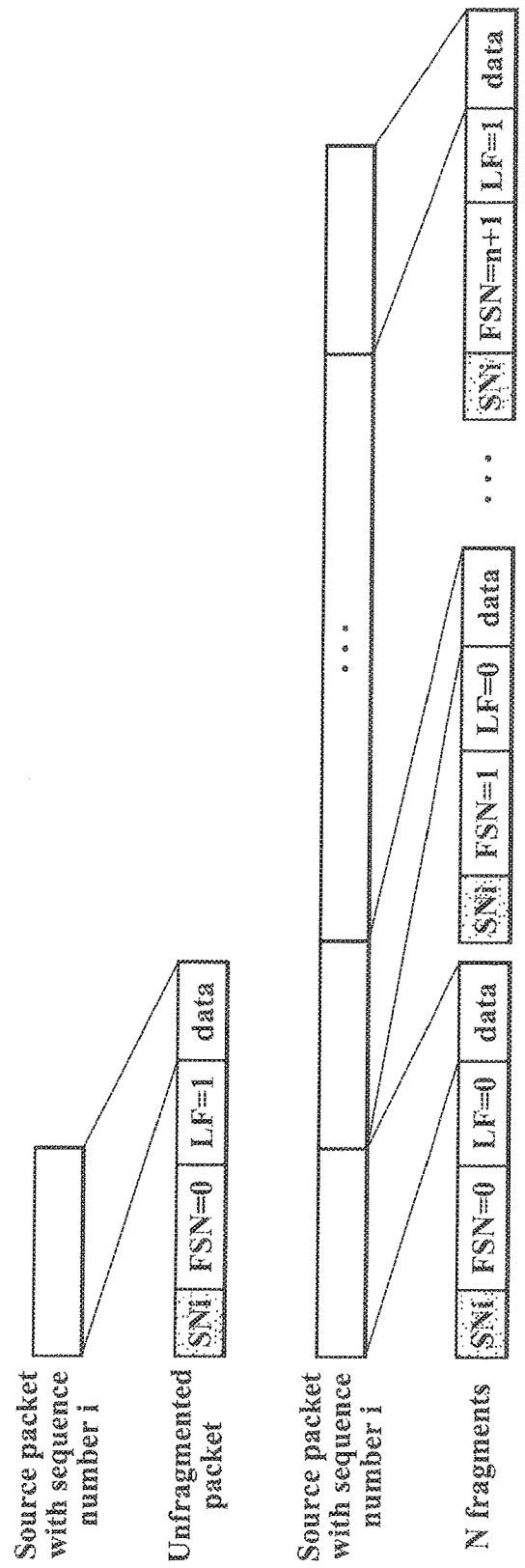
FIG. 3 shows SAR signaling by fragment numbering.
Figure 4:
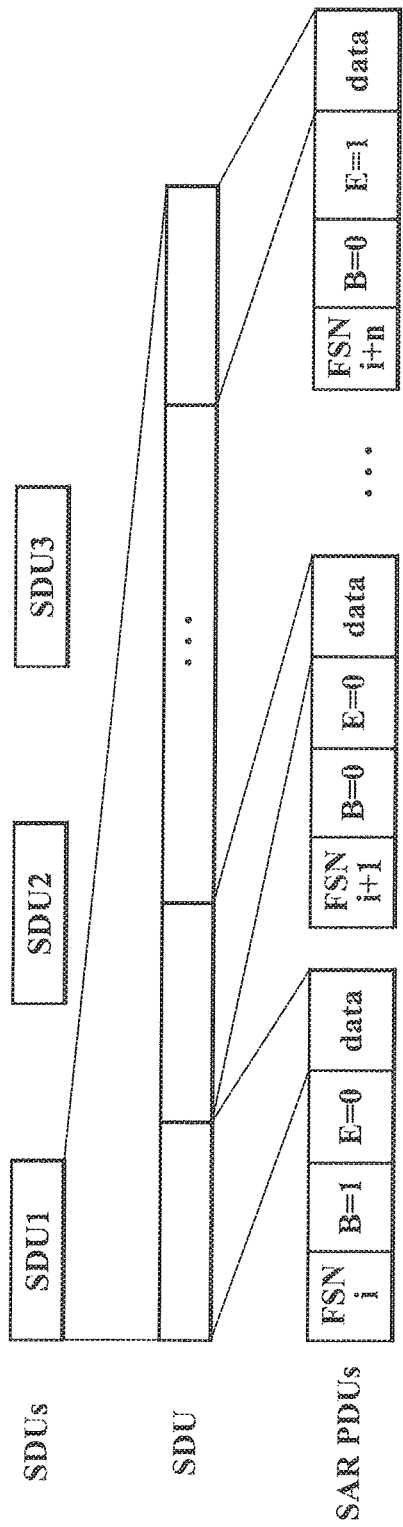
FIG. 4 shows SAR signaling with Beginning and End flags.
Figure 5:
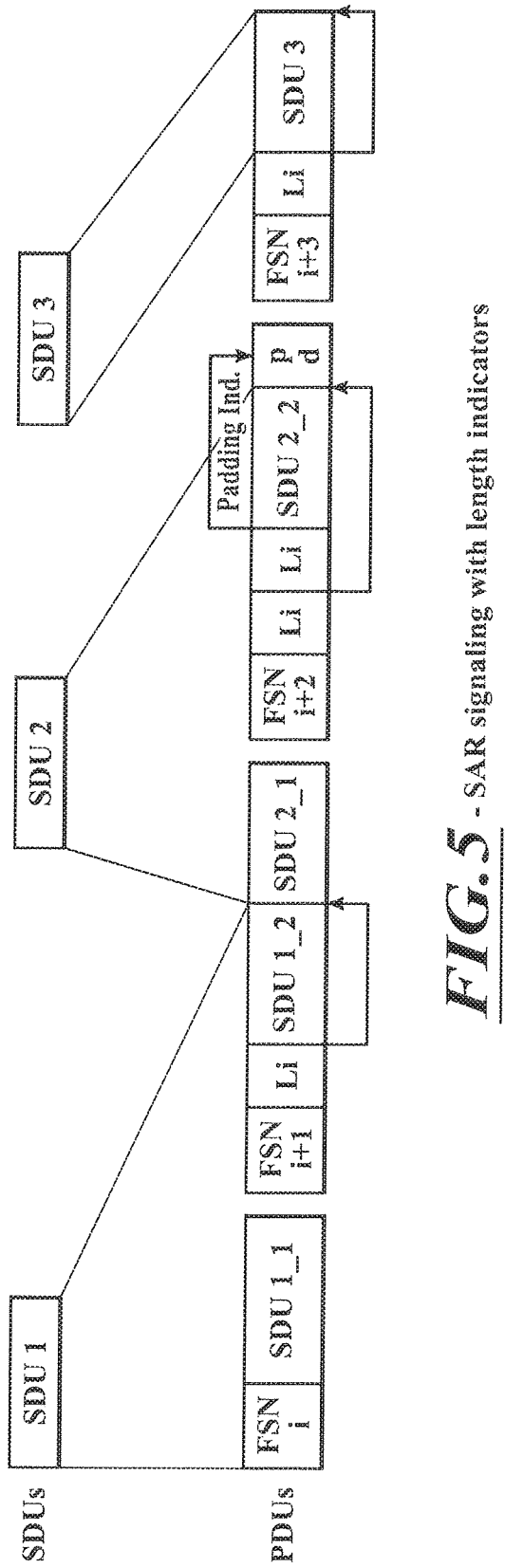
FIG. 5 shows SAR signaling with length indicators.
Figure 6:
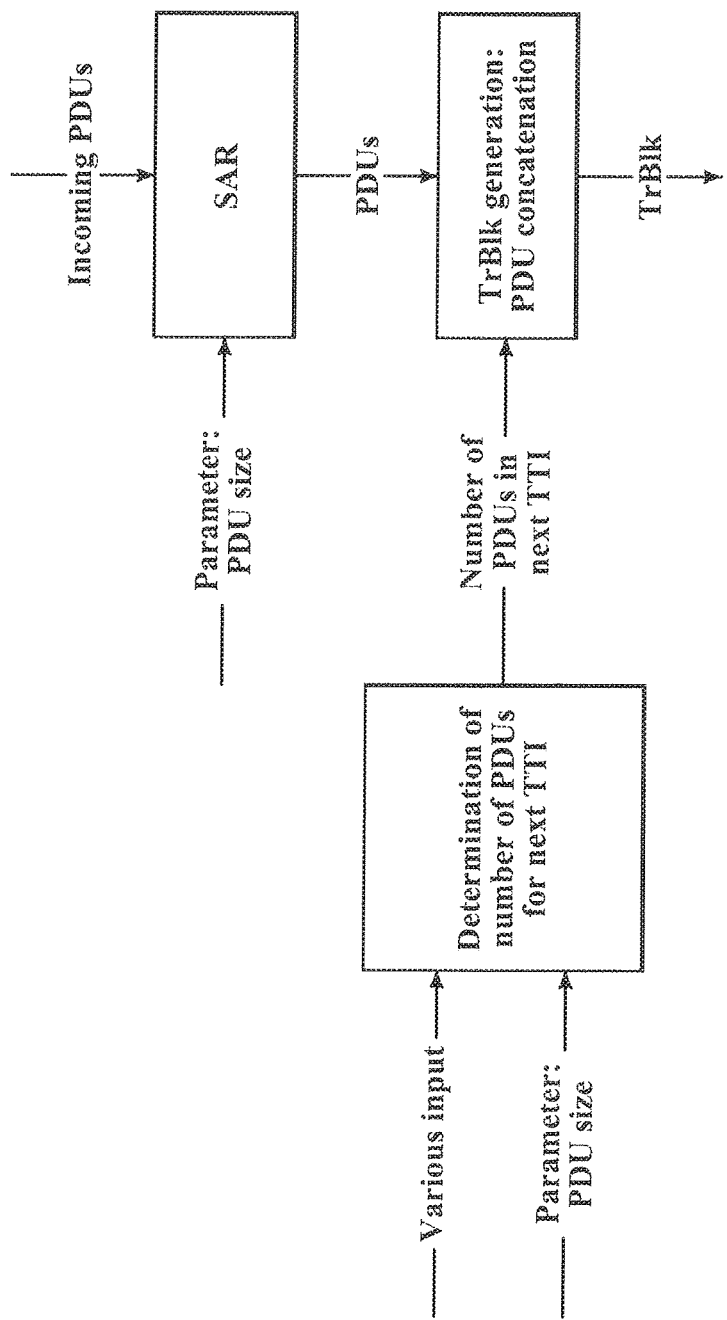
FIG. 6 shows the SDU Segmentation and PDU concatenation Processes.
Figure 7:
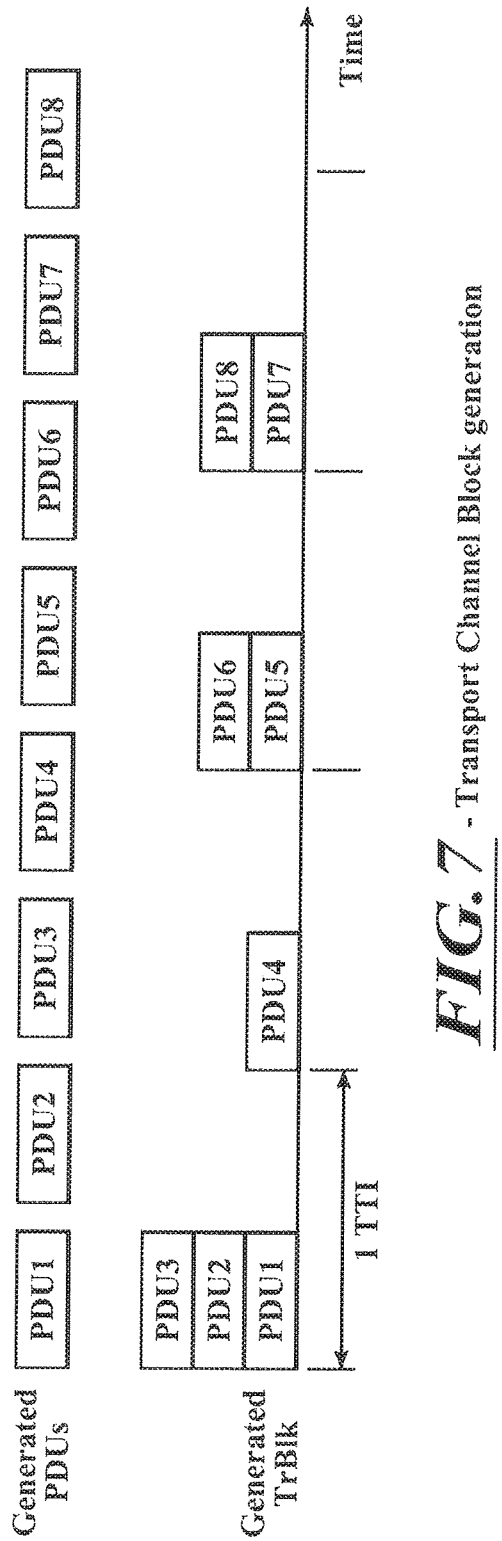
FIG. 7 shows Transport Channel Block generation.
Figure 8:
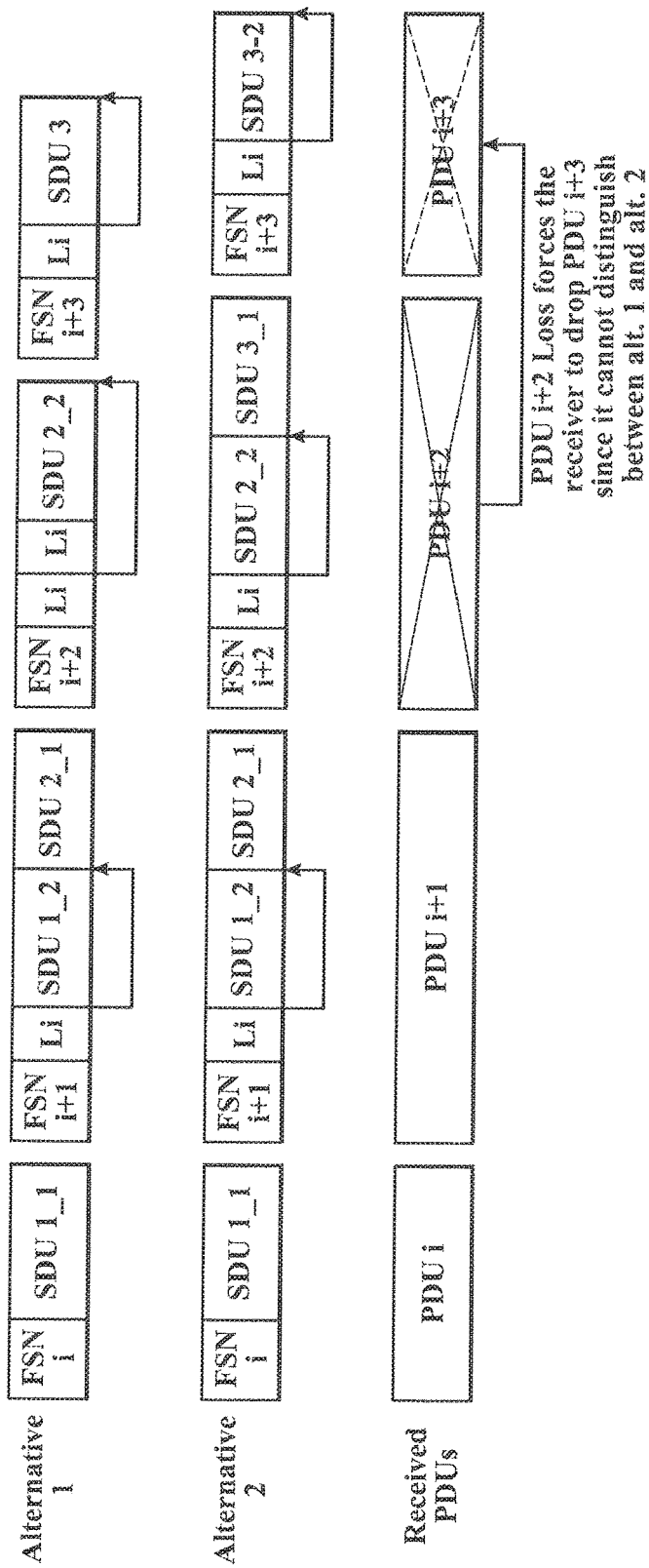
FIG. 8 shows error propagation in UMTS R99.
Figure 9:
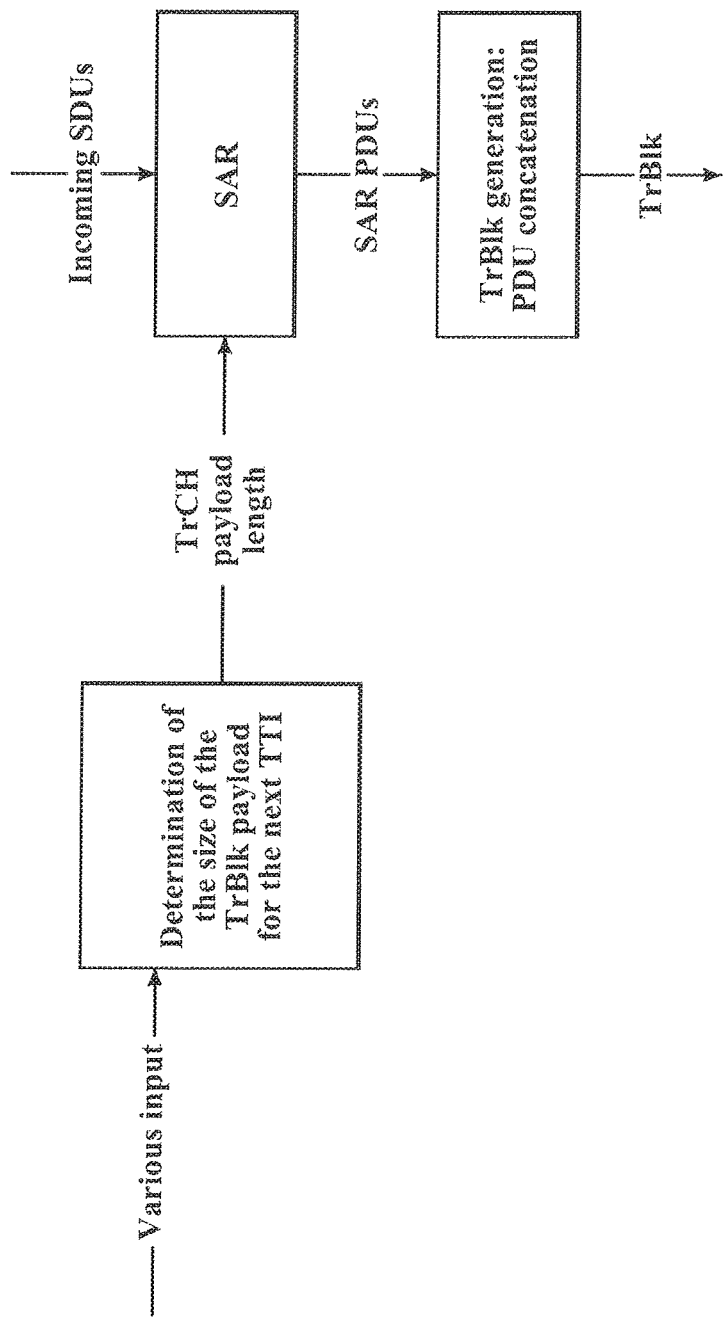
FIG. 9 shows the SAR and concatenation processes of an embodiment of the present invention.

SDU segmentation and PDU concatenation both depend on the physical resources that are allocated for transmission for the next TTI. For instance the size of the payload of the next transport channel block (Size_ind) can be indicated to the SAR function as shown in FIG. 9.

Figure 10:
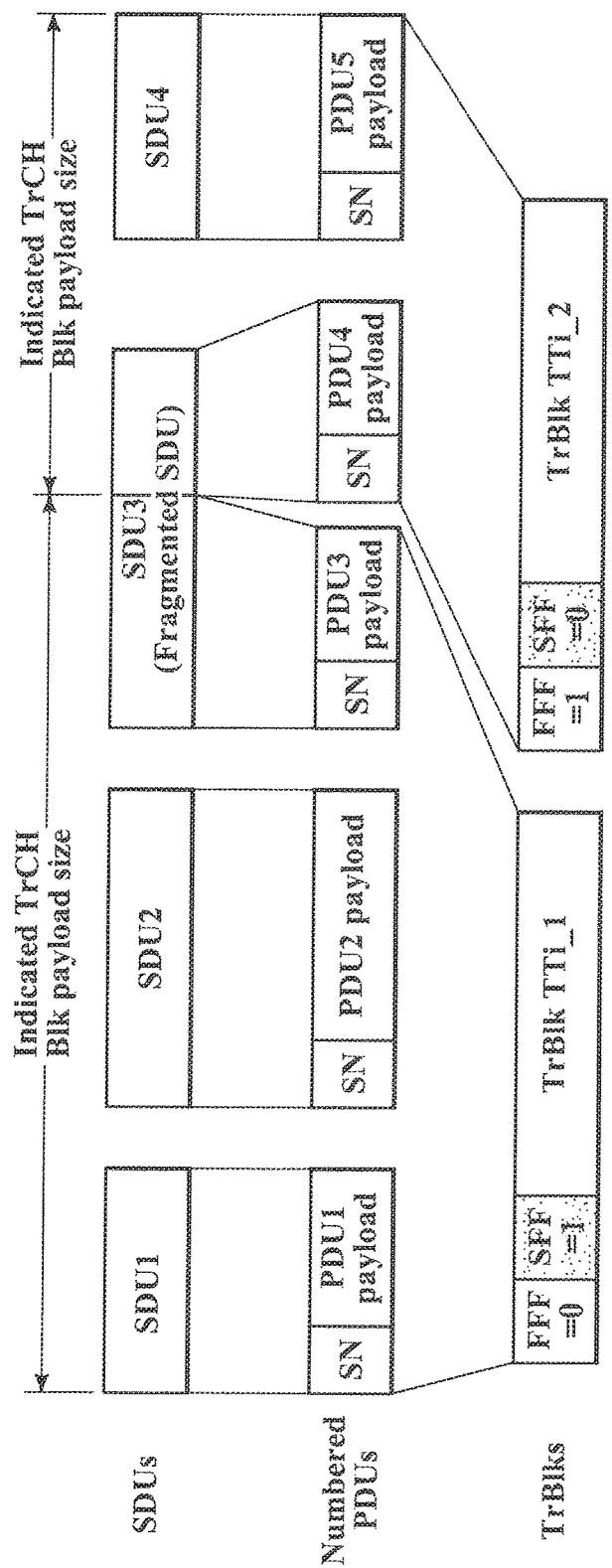
FIG. 10 shows the SAR and concatenation flow with Fragmentation Flag of an embodiment of the present invention.

Based on this indication, the SAR function selects n SDUs, the total size of which is just above Size_ind. If the sum of the length of the n SDUs is greater than Size_ind, the SAR function segments the last SDU in two fragments. The sum of the n−1th SDUs and the first fragment of the nth SDU is equal to Size_ind. Each of them is transformed into a PDU and receives a sequence number attributed sequentially. For the next transmission, the second fragment will be considered first. This is shown in FIG. 10, where the SDU3 is fragmented in 2 PDUs (PDU3 and PDU4).

Therefore by construction, all formed PDUs are full SDUs except the first and the last ones in a transport block (TrBlk), which may be a fragment of an SDU. All the others are full SDUs, therefore it is sufficient to indicate to the receiver whether the first and the last PDUs in a transport block are fragments of an SDU or a full SDU. This can be done easily by 2 one-bit flags or fragmentation flags attached to the TrBlk header. The first fragmentation flag, or FFF, indicates whether the first SAR PDU in the TrBlk is a fragment of an SDU or not and the second fragmentation flag (SFF) indicates whether the last SAR PDU in the TrBlk is a fragment of an SDU or not.

Figure 12:
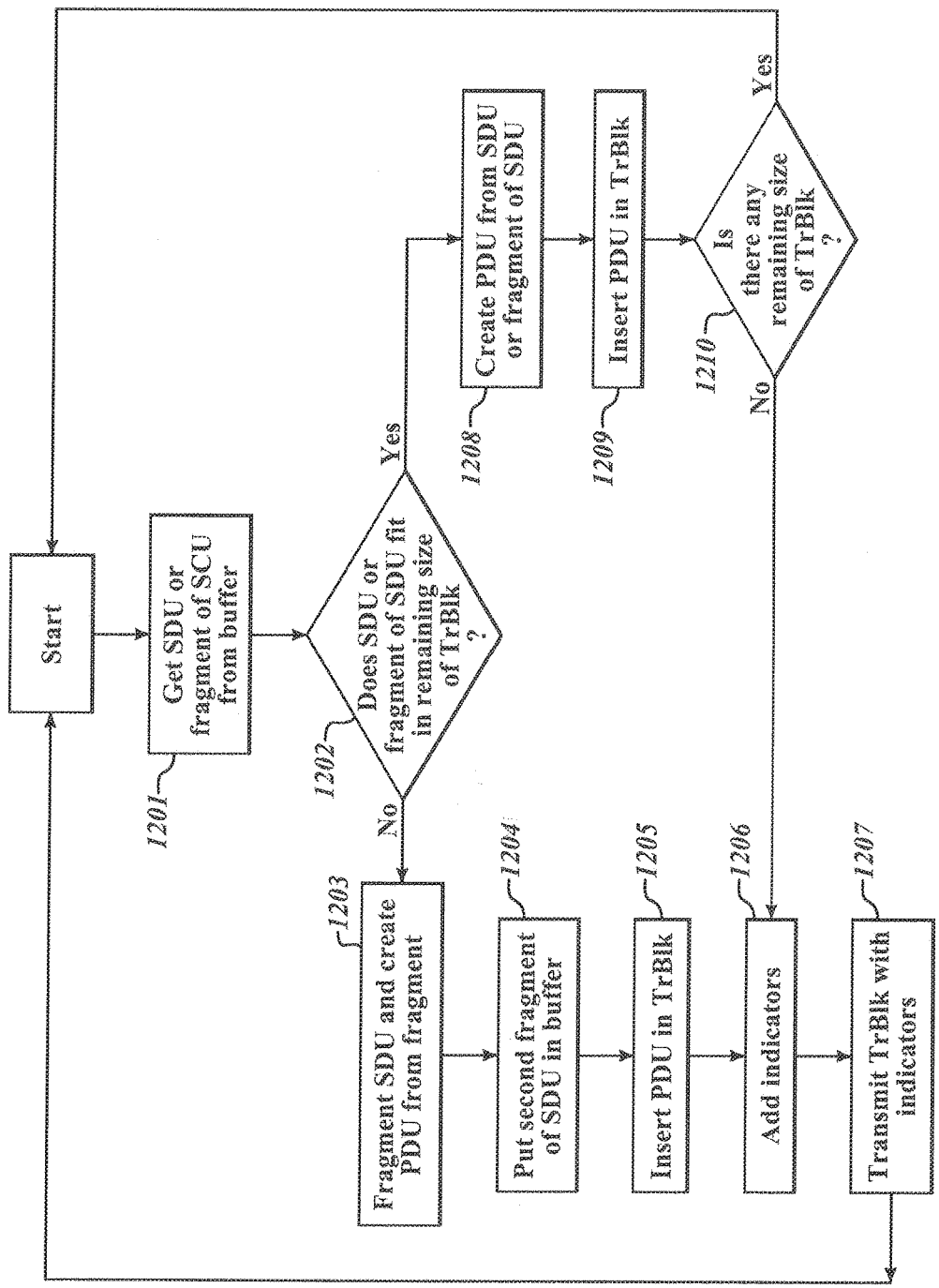
FIG. 12 is a flow diagram for the segmentation and concatenation process.

This process can be described in a generalized form along the lines of FIG. 12. SDUs or fragments of SDUs are taken from a buffer and it is then determined whether the SDU or fragment of an SDU fits in the remaining size of the transport block, which might be the whole of the transport block or only a part thereof. If the full SDU or fragment of the SDU fits in the remaining size of the transport block, a PDU is created from this SDU. This PDU is then inserted in the transport block.

The transport block is checked whether there is any size remaining if there is, the process starts over again, if there is not, the indicators are added and the transport block is transmitted with the indicators.

If however, the SDU or fragment of the SDU does not fit in the remaining size of the transport block, the SDU is fragmented and a PDU is created from a fragment of the SDU to fit into the remaining size of the transport block. The second fragment of the SDU is put in the buffer and the PDU is then inserted into the transport block and the indicators added.

The first fragmentation flag (FFF) indicates whether the first PDU in the transport block is a fragment of SDU or not and the second fragmentation flag (SFF) indicates whether the last PDU in the transport block is a fragment of an SDU or not.

Finally, the transport block is transmitted with the indicators and the process can start again.

When receiving a transport block n with the FFF set to 1, the receiver knows that the first SAR PDU in the TrBlk must be combined with the last SAR PDU of the previous TrBlk n−1. This TrBlk may have also indicated that the last SAR PDU in this TrBlk is a fragment of an SDU by setting the SFF to 1.

In a lossless system, FFF and SFF provide redundant information and are not really needed. However in a lossy system such as a wireless system, this is helpful to prevent error propagation. Indeed, if the (n−1)th TrBlk in the previous example had been lost, the receiver unit would have detected this loss thanks to the SAR PDU sequence numbering, and the FFF in the nth TrBlk would have indicated that the first PDU can be discarded as the corresponding SDU is incomplete. However the second and subsequent PDU in the nth TrBlk will be kept and used in the re-assembly function.

If only one PDU is transmitted per SDU, FFF and SFF may still have different values. FFF would indicate whether the PDU should be combined with the last PDU of the previous TrCh Blk and SFF would indicated whether the PDU should be combined with the first PDU of the next TrCh Blk.

One important aspect of the invention is to signal SAR information not at PDU level (i.e., in the PDU header) but rather in the TrBlk header. By using variable size PDU and simple segmentation and concatenation rules, it is proposed to indicate SAR information with only 2 bits per TrBlk header, which indicate the status (fragmented, not fragmented) of the first and the last PDU that are concatenated in the TrBlk.

Compared to the prior art solution, the SAR information is only 2 bits per TrBlk, which has to be compared to 2*n bits per TrBlk for the SAR signaling with beginning/end flags, where n is the number of PDU in the TrBlk. This is a significant decrease when many PDUs are concatenated in the same TrBlk.

Figure 11:
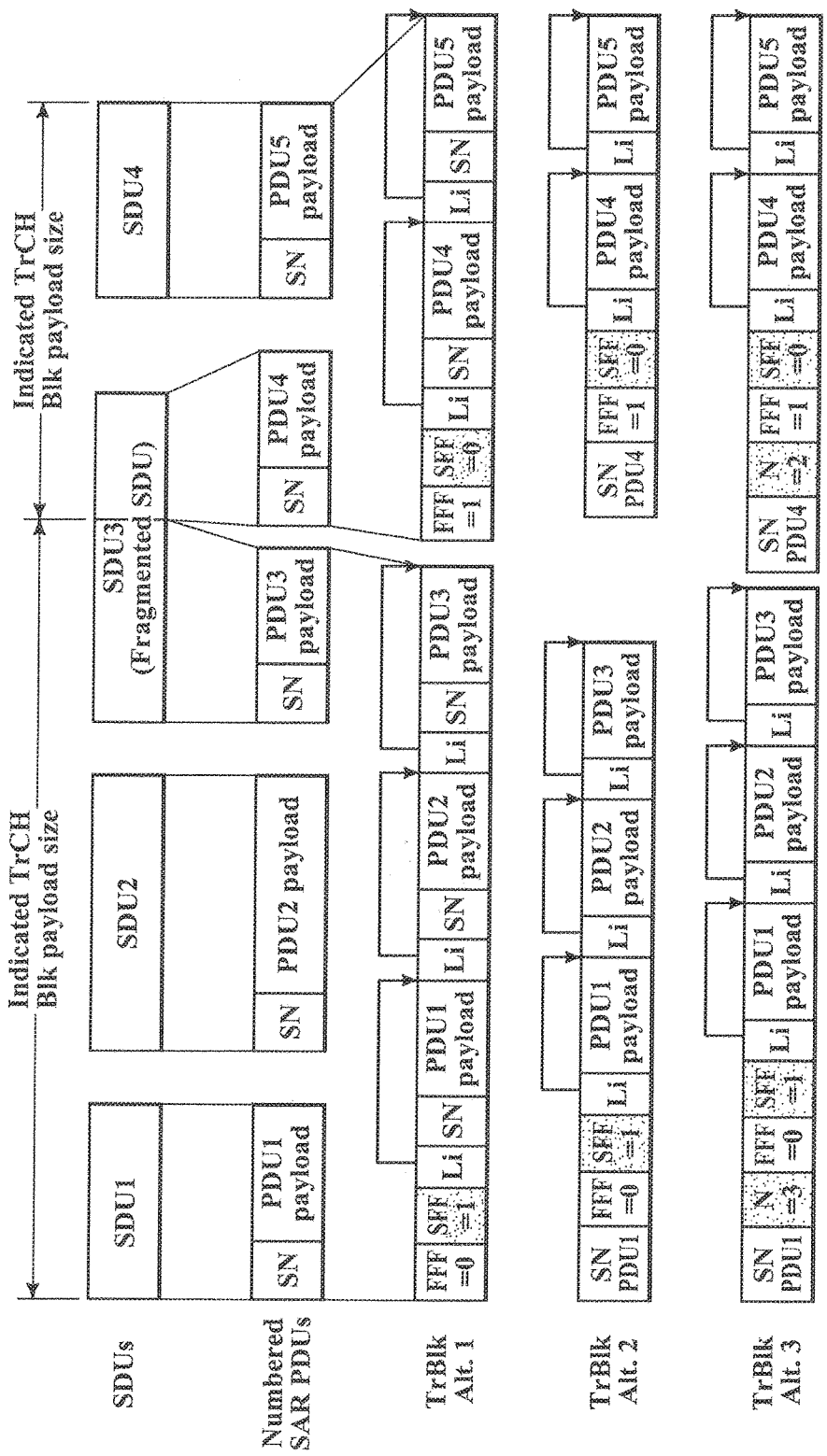
FIG. 11 shows SAR signaling with Fragmentation Flags according to an embodiment of the present invention.

As can be seen, it is assumed that the SAR PDU size is variable. For example, in the current state of UMTS, the size of the PDU is fixed and is a static parameter of the bearer used to carry the service. There is sometimes a need to inform the receiver where the PDU boundaries can be found. Then it is required to indicate the length of each PDU in the SAR PDU header with length indicators as shown in FIG. 11. This is actually equivalent to the length indicator fields that are used in the SAR signaling techniques with length indicators to signaled SDU boundaries within each PDU.

Moreover it would be possible to further save space by signaling only one SAR PDU sequence number per TrBlk. The sequence number of the first PDU or the last PDU in the TrBlk can be used for this purpose. The receiver can count the number of length indicators contained in the TrBlk to get the number of concatenated PDUs or a small field N indicating this number can be added in the TrBlk header as shown as in FIG. 11.

Another embodiment of the invention relates to the implementation of the above described various embodiments using hardware and software. It is recognized that the various above mentioned methods may be implemented or performed using computing devices (processors) as for example general purpose processors, digital signal processors (DSP), applications specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also, a combination of software modules and a hardware implementation may be possible.

The software modules may be stored on any kind of computer-readable storage media, for example RAM, EPROM, EEPROM, flash memory, registers, hard disks, CD-ROM, DVD, etc.

The invention claimed is:

1. A method for transmitting a data packet having a header and a radio link control protocol data unit, comprising steps of:
   configuring the radio link control protocol data unit to transport at least one full radio link control service data unit, one or two radio link control service data unit fragments, or at least one full radio link control service data unit and at least one radio link control service data unit fragment, where a radio link control service data unit fragment is only located (i) at the beginning of the radio link control protocol data unit or at the end of the radio link control protocol data unit or (ii) at the beginning of the radio link control protocol data unit and at the end of the radio link control protocol data unit;
   configuring a single field in the header consisting of a first bit and a second bit, even when a number of full radio link control service data units and radio link control service data unit fragments in the radio link control protocol data unit is more than two, the single field indicating whether (i) the radio link control protocol data unit begins with a fragment of a radio link control service data unit and (ii) the radio link control protocol data unit ends with a radio link control service data unit fragment;
   forming the data packet including the configured header and the configured radio link control protocol data unit; and
   transmitting the data packet.

2. The method according to claim 1, wherein the first bit indicates whether the radio link control protocol data unit begins with a radio link control service data unit fragment and the second bit indicates whether the radio link control protocol data unit ends with a radio link control service data unit fragment.

3. The method according to claim 2, wherein the radio link control protocol data unit includes at least one full radio link control service data unit, a first radio link control service data unit fragment configured at the beginning of the data packet radio link control protocol data unit, and a second radio link control service data unit fragment configured at the end of the data packet radio link control protocol data unit.

4. An apparatus for transmitting a data packet having a header and a radio link control protocol data unit, comprising:
   one or more computing devices to:
   configure the radio link control protocol data unit to transport at least one full radio link control service data unit, one or two radio link control service data unit fragments, or at least one full radio link control service data unit and at least one radio link control service data unit fragment, where a radio link control service data unit fragment is only located (i) at the beginning of the data packet radio link control protocol data unit or at the end of the data packet radio link control protocol data unit or (ii) at the beginning of the data packet radio link control protocol data unit and at the end of the data packet radio link control protocol data unit;
   configure a single field in the header consisting of a first bit and a second bit even when a number of full radio link control service data units and radio link control service data unit fragments in the radio link control protocol data unit is more than two, the single field indicating whether (i) the data packet radio link control protocol data unit begins with a fragment of a radio link control service data unit and (ii) the data packet radio link control protocol data unit ends with a radio link control service data unit fragment; and form the data packet including the configured header and the configured radio link control protocol data unit; and a transmitter to transmit the data packet.

5. The apparatus according to claim 4, wherein the first bit indicates whether the radio link control protocol data unit begins with a radio link control service data unit fragment and the second bit indicates whether the radio link control protocol data unit ends with a radio link control service data unit fragment.

6. The apparatus according to claim 5, wherein the radio link control protocol data unit includes at least one full radio link control service data unit, a first radio link control service data unit fragment configured at the beginning of the data packet radio link control protocol data unit, and a second radio link control service data unit fragment configured at the end of the data packet radio link control protocol data unit.

7. A method for receiving a data packet, comprising steps of:

receiving the data packet that includes a data packet header and a data packet radio link control protocol data unit, the data packet header including a single field consisting of a first bit and a second bit even when a number of full radio link control service data units and radio link control service data unit fragments in the data packet radio link control protocol data unit is more than two, the single field indicating whether (i) the data packet radio link control protocol data unit begins with a fragment of a radio link control service data unit and (ii) the data packet radio link control protocol data unit ends with a radio link control service data unit fragment; and the data packet radio link control protocol data unit including at least one full radio link control service data unit, one or two radio link control service data unit fragments, or at least one full radio link control service data unit and at least one radio link control service data unit fragment, where a radio link control service data unit fragment is only located (i) at the beginning of the data packet radio link control protocol data unit or at the end of the data packet radio link control protocol data unit or (ii) at the beginning of the data packet radio link control protocol data unit and at the end of the data packet radio link control protocol data unit; and restructuring radio link control service data unit(s) and/or radio link control service data unit fragment(s) in the received data packet based on the single field.

8. The method for receiving a data packet according to claim 7, wherein the first bit indicates whether the data packet radio link control protocol data unit begins with a radio link control service data unit fragment and the second bit indicates whether the data packet radio link control protocol data unit ends with a radio link control service data unit fragment.

9. The method for receiving a data packet according to claim 8, wherein the data packet radio link control protocol data unit includes at least one full radio link control service data unit, a first radio link control service data unit fragment configured at the beginning of the data packet radio link control protocol data unit, and a second radio link control service data unit fragment configured at the end of the data packet radio link control protocol data unit.

10. An apparatus for receiving a data packet, comprising:

a receiver to receive the data packet that includes a data packet header and a data packet radio link control protocol data unit, the data packet header including a single field consisting of a first bit and a second bit even when a number of full radio link control service data units and radio link control service data unit fragments in the data packet radio link control protocol data unit is more than two, the single field indicating whether (i) the data packet radio link control protocol data unit begins with a fragment of a radio link control service data unit and (ii) the data packet radio link control protocol data unit ends with a radio link control service data unit fragment; and the data packet radio link control protocol data unit including at least one full radio link control service data unit, one or two radio link control service data unit fragments, or at least one full radio link control service data unit and at least one radio link control service data unit fragment such that a radio link control service data unit fragment is only located (i) at the beginning of the data packet radio link control protocol data unit or at the end of the data packet radio link control protocol data unit or (ii) at the beginning of the data packet radio link control protocol data unit and at the end of the data packet radio link control protocol data unit; and one or more computing devices to restructure radio link control service data unit(s) and/or radio link control service data unit fragment(s) in the received data packet based on the single field.

11. The apparatus for receiving a data packet according to claim 10, wherein the first bit indicates whether the data packet radio link control protocol data unit begins with a radio link control service data unit fragment and the second bit indicates whether the data packet radio link control protocol data unit ends with a radio link control service data unit fragment.

12. The apparatus for receiving a data packet according to claim 11, wherein the data packet radio link control protocol data unit includes at least one full radio link control service data unit, a first radio link control service data unit fragment configured at the beginning of the data packet radio link control protocol data unit, and a second radio link control service data unit fragment configured at the end of the data packet radio link control protocol data unit.

* * * * *